D. HARTMANN.
Combination Tool.
No. 227,773.    Patented May 18, 1880.
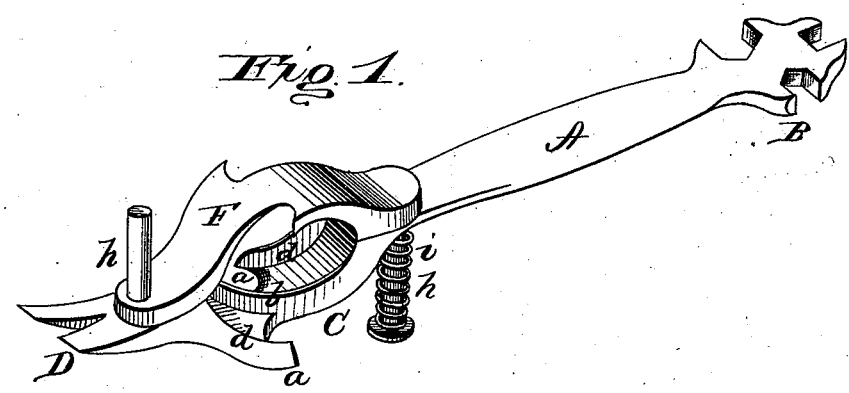
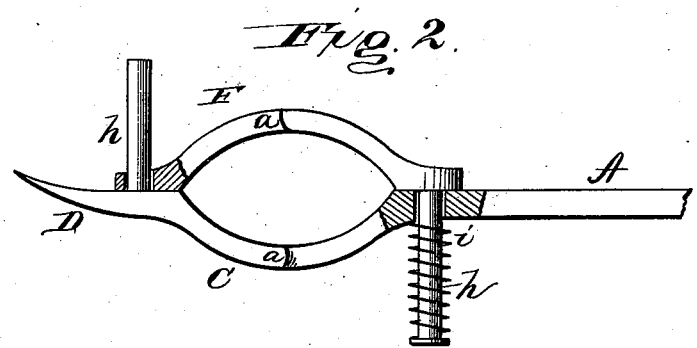
Witnesses:
A. L. Ouraud
H. Aubrey Toulmin
Inventor:
D. Hartmann
Alexander Mason

UNITED STATES PATENT OFFICE.

DOMINIKUS HARTMANN, OF MANSFIELD, OHIO.

COMBINATION-TOOL.

SPECIFICATION forming part of Letters Patent No. 227,773, dated May 18, 1880.

Application filed February 25, 1880.

*To all whom it may concern:*

Be it known that I, DOMINIKUS HARTMANN, of Mansfield, in the county of Richland, and in the State of Ohio, have invented certain new and useful Improvements in Combination-Tools; and I do hereby declare that the following is a full, clear, and exact description thereof, reference being had to the accompanying drawings, and to the letters of reference marked thereon, making a part of this specification.

The nature of my invention consists in the construction of a combination-tool embodying in one implement a corn-sheller and a number of tools, as will be hereinafter more fully set forth.

In order to enable others skilled in the art to which my invention appertains to make and use the same, I will now proceed to describe its construction and operation, referring to the annexed drawings, in which—

Figure 1 is a perspective view of my combination-tool, and Fig. 2 is a detailed section of a part thereof.

A represents the handle, made of a straight bar of metal, formed at one end with a wrench, B, having three different-sized notches. If desired, one side of this end of the handle may be enlarged to form a tack-hammer. This may be done in any suitable or convenient manner. The other end of the handle A is formed with a bulge, C, and terminates with a claw, D, which latter answers a threefold purpose. It may be used as a stove-lifter, a tack-puller, and a screw-driver.

The bulged part C is formed with a tooth, *a*, on each edge, and its concave side is formed with one long rib, *b*, and two short ribs, *d d*, running in inclined position, as shown. This bulged part C, in connection with a similarly-constructed movable part, F, constitutes a hand corn-sheller, which may be used from either side. The movable part or jaw F is held in place by means of two pins, *h h*, and a spiral spring, *i*, substantially as shown. The pins *h h* are represented as extending in opposite directions, but in practice they will be on the same side, so as not to interfere with the use of the claw D.

The combination-tool thus constructed is handy and convenient. It can be manufactured cheaply, is strong, durable, and not liable to get out of order.

Having thus fully described my invention, what I claim as new, and desire to secure by Letters Patent, is—

The combination-tool herein described, consisting of the handle A, wrench B, claw D, and corn-sheller C F, substantially as set forth.

In testimony that I claim the foregoing I have hereunto set my hand this 11th day of February, 1880.

DOMINIKUS HARTMANN.

Witnesses:
LEROY PARSONS,
C. SHUMWAY, Jr.